United States Patent Office 3,232,692
Patented Feb. 1, 1966

3,232,692
SIMULTANEOUSLY DYEING AND RESIN
FINISHING TEXTILES
Hans Wilhelm, Gerd Louis, Dieter Mahling, Guenter
Lange, and Hans Weidinger, Ludwigshafen (Rhine),
Karl Craemer, Heidelberg, Wolfgang Schwindt, Ludwigshafen (Rhine), Guenter Krehbiel, Mannheim, and
Hans Guenter Wippel, Ludwigshafen (Rhine), Germany,
assignors to Badische Anilin- & Soda-Fabrik Aktiengesellschaft, Ludwigshafen (Rhine), Germany
No Drawing. Filed July 10, 1962, Ser. No. 208,896
Claims priority, application Germany, Feb. 28, 1961,
B 61,466; July 26, 1961, B 63,406
9 Claims. (Cl. 8—18)

This application is a continuation-in-part of our application Serial No. 175,793, filed February 26, 1962, now abandoned.

This invention relates to a new process for the printing or simultaneous dyeing and/or optical brightening and resin finishing of textiles.

It is known to use dispersions of highly polymerized substances especially the so-called emulsion polymers, to a great extent for textile chemical treatment. They impart good feel, fullness, elasticity, weighting, stiffness, smoothness, nonslip properties and sheen to the fabrics treated. In addition to urea and melamine condensates used for this purpose, polymer dispersions also occupy an important position in the resin finishing of fabrics, for example for improving abrasion resistance of crease resist finishes. Examples of these are dispersions of homopolymers and copolymers of acrylic esters or vinyl esters, such as polyvinyl acetate dispersions in finely disperse or coarse disperse formulations, polyvinyl acetate dispersions containing plasticizer, dispersions of copolymers of vinyl acetate with vinyl chloride or vinylidene chloride, polyethyl acrylate or polybutyl acrylate dispersions or dispersions of copolymers of acrylic esters and styrene.

The said emulsion polymers may be used for processing a large number of articles, for example for finishing cotton or spun rayon textiles, such as shirting, apron material, material for national costumes and special-purpose clothing, for the finishing of raised style fabrics, draperies, upholstery fabrics, mattress ticking and cord fabrics, and also for stiffening curtains or woolen dress materials.

In addition to their use as textile finishes, in which air permeability of the fabric should be retained, polymer dispersions are used widely for the surface coating of textiles, for example for the production of coated fabrics, protective clothing, oilcloth, lining materials, waterproof calico, iron-on materials, stiffening materials, non-skid carpets or for doubling fabrics, the material being mechanically aftertreated, if desired, for example, with embossing rollers or graining presses.

The use of emulsion polymers having condensable groups, for example N-methylol groups or N-methylol ether groups, has already been proposed for the said purpose; these emulsion polymers may be crosslinked with themselves or with the fibre by a suitable aftertreatment, for example with acids or heat. Such finishing has hitherto been carried out as an aftertreatment separate from the dyeing process. It often has the disadvantage that the shade of the dyed material is changed by reason of the aftertreatment.

It has also been proposed to carry out dyeing and resin-finishing of textiles in one operation by using colored emulsion copolymers which have been obtained by copolymerization of dyes having vinyl groups with vinyl compounds containing groups which are crosslinkable by condensation or addition. These copolymers, which may contain, besides the said components, polymerized-in conventional vinyl compounds which are no longer reactive, are then crosslinked with themselves or with other substances causing crosslinking after application to the fibre. This method is however only suitable for dyes which contain polymerizable double linkages.

It is an object of this invention to provide a method of producing permanent dyeings and/or optical brightening effects and resin finishes on textiles. Another object of the invention is to carry out the dyeing and/or optical brightening and chemical treatment processes of textiles in a single operation. Another object is to effect chemical combination between the dye, fluorescent dye, or optical brightener and the polymer used for resin finishing. Another object of the invention is to produce permanent, possibly fluorescent, prints on textiles.

These and other objects are achieved by reacting a polymer containing reactive groups by way of some of these reactive groups with a dye, fluorescent dye or optical brightener also containing reactive groups, applying the macromolecular colored or optically brightened compound thus obtained to the textile material and crosslinking it by way of the remaining reactive groups, or by applying the polymer containing reactive groups, the dye containing reactive groups and if desired a compound having crosslinking action to the textile material and carrying out in one operation the reaction of the polymer with the dye or optical brightener and the crosslinking on the fibre.

Reactive groups in the polymer are to be understood as groups which will not react under the conditions of polymerization but which are capable of subsequent reaction by condensation or addition. By these reactions a reactive, possibly fluorescent, dye or optical brightener is chemically combined to the polymer either directly or by way of a bifunctional or polyfunctional compound and the polymer is then converted by crosslinking into an insoluble state by way of the remaining reactive groups which have not reacted with the dye or optical brightener, this crosslinking being effected either indirectly, i.e., with an addition of a bifunctional or polyfunctional compound, or directly, i.e., without the addition of such a compound, for example, by the action of heat or change in pH value. If desired, additional groups may be introduced into the polymer molecule by way of the said reactive groups; these groups may be such as to influence the finishing effect, for example long-chain hydrocarbon radicals. Unless otherwise specified, the term "dye" as used herein is intended to include fluorescent dyes and non-fluorescent dyes as well as fluorescent brightening agents.

The polymers to be used for the process according to this invention may be homopolymers or copolymers of monomers which contain reactive groups of the above-mentioned type. Examples of suitable reactive groups are amino groups, hydroxyl groups, aldehyde groups, carboxylic acid groups, carboxylic acid ester groups, lactone groups, carbonamide groups, carbonimide groups, carbamido groups, melamine groups, dicyanodiamide groups, carbamate groups, epoxy groups, N-methylol groups, N-methylol ether groups, chlorohydrin groups, isocyanate groups, active methylene groups, acid chloride groups, acid anhydride groups, reactive halogen atoms, carbon-carbon double linkages capable of addition and not taking part in the polymerization, and the corresponding sulfur analogs of the said groups, such as thiourea groups and thioisocyanate groups.

Examples of monomers containing such groups are acrolein, acrylamide, methacrylamide, crotonamide, α-ethylacrylamide, α-chloroacrylamide, α-phenylacrylamide, maleic acid diamide, fumaric acid diamide, itaconic acid diamide, citraconic acid diamide, N-acryloylurea, N-methacryloylurea, compounds of the general formulae:

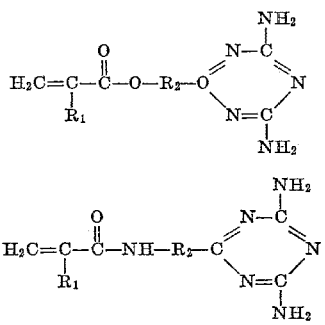

and

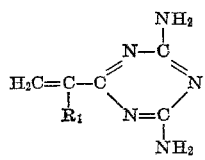

in which $R_1$ denotes a hydrogen atom or a methyl group and $R_2$ denotes a short-chain alkylene group or a substituted short-chain alkylene group, N-acryloxyldicyanodiamide, N-methacryloyldicyanodiamide, carbamic acid derivatives or thiocarbamic acid derivatives, such as and

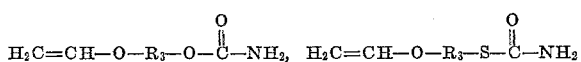

and

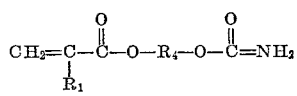

in which $R_3$ denotes a short-chain alkylene group or a cyclohexylene group and $R_4$ denotes a short-chain alkylene group or a phenylene group and $R_1$ has the above meaning, monoamino - bis - (allyloxy)-triazines, diaminoallyloxytriazines and glyoxalmonoureine allyl ether, glycidyl acrylate and butanediol monoacrylate.

The polymers to be used according to this invention may also contain reactive radicals of different types of which one type will react with the dye whereas the other type will serve for crosslinking. For example a dye which contains an active methylene group will condense with an aldehyde group in the polymer, and a N-methylol group also present therein will lead to direct crosslinking.

The copolymers may have been prepared while using further polymerizable compounds which do not contain condensable groups, for example aromatic vinyl compounds, such as styrene and its polymerizable derivatives, polymerizable unsaturated hydrocarbons, such as butadiene and isoprene, nitriles, amides, N-substituted amides, esters, anhydrides and salts of unsaturated polymerizable monocarboxylic or dicarboxylic acids, such as acrylic acid or its $\alpha$- or $\beta$-substituted derivatives, such as methacrylic acid, crotonic acid, maleic acid, fumaric acid, itaconic acid or citraconic acid, vinyl esters of organic or inorganic acids, such as vinyl acetate, vinyl propionate or vinyl butyrate, vinyl halides, such as vinyl chloride and vinyl bromide, vinylidene halides, vinyl ethers, esters of allyl alcohol, vinylamines, such as vinylcarbazole, vinylpyridine, vinylimidazole, vinylquinoline, vinyllactams, such as vinylpyrrolidone, vinylcaprolactam or vinylcaprylolactam. These basic compounds are also suitable as monomeric components in the form of their quaternary salts; quaternary salts of basic vinyl ethers, of acrylamides and methacrylamides substituted on the nitrogen atom by basic groups and also of esters of basic alcohols and polymerizable carboxylic acids are also suitable for the purpose.

On the other hand the high polymers containing reactive groups may also have been obtained by introducing the desired reactive groups into the polymer, for example by halogenating polymers, saponification of vinyl ester polymers, reaction of amide groups with formaldehyde, reduction of nitrile groups to amino groups, saponification of nitrile groups to amide and carboxyl groups, halogenation, chloromethylation, sulfurization of polyvinylaromatics, such as polystyrene and reduction of nitrated polyvinylaromatics to the corresponding polyamines.

Homopolymers or copolymers of the said types may be prepared by conventional processes, for example, in aqueous or organic solution, in aqueous emulsion or as bulk polymers. Precipitation polymerization may also be used. In emulsion polymerization the usual emulsifiers and protective colloids are used, such as paraffin sulfonates, aralkylsulfonates, adducts of ethylene oxide to fatty oils or polyvinyl alcohol.

The number of reactive groups in the polymer molecule may vary within a wide range. For example each monomer unit from which the polymer is built up may bear a reactive group. It is however not necessary that every one of these groups should react in the crosslinking operation. In general, not less than 0.5 mol percent of monomer units with reactive groups should be available in the polymer for crosslinking.

As a rule the molar proportion of reactive groups in the polymer is between 5 and 10%; of these about 2 to 5% serve for crosslinking and the remainder for combination with the dye. For the production of products of deep color and/or of great hardness it is often necessary to start from higher molar proportions of reactive groups.

The polymerization initiators may be the substances conventionally used for this purpose, such as peroxides, for example hydrogen peroxide, persulfates, such as potassium persulfate, sodium persulfate or ammonium persulfate, redox systems, for example, potassium persulfate-sodium formaldehyde sulfoxylate, other radical-forming substances, for example azodiisobutyronitrile, or mixtures of these substances.

Dyes which themselves contain reactive groups may be combined with the said polymers. These reactive groups may be, for example, acid amide groups, monosubstituted acid amide groups, N-methylol acid amide groups, acid imide groups, ureido groups, thioureido groups, dicyanodiamide groups, carboxylic acid groups, carboxylic acid ester groups, sulfonic acid groups, sulfonic acid ester groups, aldehyde groups, epoxy groups, chlorohydrin groups, isocyanate groups, N-methylol groups, N-methylol ether groups, amino groups, hydroxyl groups, active methylene groups and vinyl groups, sulfone groups, thioisocyanate groups, mucochloric acid groups, urethane groups, reactive halogen atoms, as for example in imide halides, acid halides, arylmethyl halides, allyl halides, masked vinyl groups, as for example $\beta$-chloroalkylsulfones, $\beta$-bromoalkylcarbonamides, $\beta$-ammoniumalkylcarbonamides, and also $\beta$-hydroxyalkylcarbonamides, -sulfones or -sulfonamides which have been esterified with mineral acids or with aryl and/or alkyl-substituted mineral acids.

Thus for example a dye containing epoxy groups may be reacted with a polymer containing carboxyl groups which has been obtained either by copolymerization of acrylic or methacrylic acid with other monomers or by saponification of polymers containing acrylic esters or acrylonitrile.

Dyes which bear such reactive groups are mentioned for example in the following literature references or patent applications:

U.S. patent application Ser. No. 12,262, filed March 2, 1960, by Willy Braun, Julius Eisele, Guenter Krehbiel, Guenter Lange, Roland Mueller and Hermann Weissauer;

U.S. patent application Ser. No. 34,368, filed June 7, 1960, now U.S. Pat. No. 3,117,961, by Guenter Lange, Guenter Krehbiel, Fritz Kohler and Hans-Joachim Grasshoff; U.S. patent application Ser. No. 84,524, filed January 24, 1961, now U.S. Pat. No. 3,126,369, by Hans Ruprecht Hensel, Hans Baumann, Arnold Tartter and Hermann Weissauer; U.S. patent specifications No. 958,850, No. 1,709,292, No. 2,784,204, No. 2,785,157 and No. 2,944,870; French patent specifications No. 573,503, No. 1,189,668, No. 1,198,423, No. 1,210,106, No. 1,223,110, No. 1,240,237 and No. 1,274,069; Belgian patent specification No. 578,517; German patent specifications No. 22,714, No. 409,949 and No. 896,336 and Colour Index 11,220.

Suitable fluorescent dyes, i.e., compounds which are capable of transforming visible or ultraviolet light into visible light of a greater wave length include reactive derivatives of stilbene, of fluorescent dyes of the triarylmethane series, of coumarin, of aminonaphthalic acid imide, of aminoterephthalic acid diamide and of azamonomethine cyanines.

When fluorescent reactive dyes are used for the treatment of textiles, they may either themselves be intensively colored and thus impart to the textiles a vivid brilliant coloration or they may be uncolored or faintly colored and then function as optical brightening agents. Special effects may be achieved by using the fluorescent reactive dyes or optical brighteners in admixture with other non-fluorescent dyes.

The polymer may be reacted with the dye before or during the actual finishing process, which consists chemically in the crosslinking of the polymer. Depending on the reactive groups which are contained in the polymer, they are crosslinked alone (directly) or in conjunction with other crosslinking agents (indirectly).

Examples of groups which may be crosslinked direct, for example by condensation under the influence of heat or by change in pH value, are aldehyde groups, chlorohydrin groups, epoxy groups, isocyanate groups, N-methylol groups and N-methylol ether groups. Suitable catalysts for promoting the condensation are, for example in the reaction of amide groups with N-methylol groups or of N-methylol groups with themselves, acid inorganic or organic compounds, such as ammonium nitrate, ammonium chloride, phosphoric acid and its esters, maleic acid, tartaric acid and similar substances conventionally used in the condensation of methylol compounds. These groups may also be condensed indirectly.

Groups which are accessible for indirect crosslinking by condensation or addition are for example carbonamide, carbonimide, ureido, aminotriazine, dicyanodiamide, carbamic acid, thiocarbamic acid, glyoxalmonoureine or glyoxaldiureine groups. These groups enter into known condensation reactions together with bifunctional or polyfunctional compounds, for example, with formaldehyde, condensates containing methylol groups, such as urea formaldehyde, thiourea-formaldehyde, melamine-formaldehyde, guanidine-formaldehyde, dicyanodiamide-formaldehyde condensates or phenol-formaldehyde condensates.

Other indirectly crosslinkable radicals are, for example, carboxylic acid and carboxylic acid ester groups which may be condensed for example with dihydric or polyhydric alcohols, amines, polyepoxy compounds or hydroxides of polyvalent metals, or hydroxy or amino groups, which may be reacted, for example, with divalent or polyvalent isocyanates. Examples of suitable bifunctional or polyfunctional crosslinking agents are propylene glycol, glycerin, trimethylolpropane, pentaerythritol, neopentylglycol, polyvinyl alcohol, ethylene diamine, diethylene triamine, dipropylene triamine, hexamethylene diamine, m-xylylene diamine, piperazine, hexamethylene diisocyanate and toluylene diisocyanate.

Crosslinkable groups may also be formed under the conditions of emulsion polymerization by reaction with the water used as medium, for example, hydroxyl groups from glycidyl groups or acyloxy groups, and carboxyl groups from acid anhydride groups.

Textiles may be processed according to this invention by means of aqueous dispersions, aqueous or organic solutions or by means of pastes which contain the polymer. Reaction with the dye may be carried out, prior to the treatment of the textile materials, in aqueous or organic medium. It may be carried out however by effecting chemical combination of the dye and crosslinking simultaneously. The dye to be condensed on may be added to part or whole of the monomers prior to the production of the polymers, or to the finished polymer.

All conventional apparatus, for example, padding machines, may be used for dyeing and resin finishing by the process according to this invention. For example, a 40% aqueous dispersion of a copolymer containing methylolamide groups may be mixed with a 10 to 20% aqueous solution of a dye containing amide groups so that 5% of the dye, with reference to the solids content of the dispersion, is contained in the dispersion. 0.1 to 5%, preferably 0.2 to 1%, of ammonium nitrate, with reference to the solids content of the dispersion, is added to this liquor as catalyst, the liquor is applied in a padding machine to the textile material to be finished and the material dried at 60° to 110° C., preferably 80° to 90° C., on a tenter. Crosslinking and condensation with the dye finally take place in a condensation chamber (hot-air dryer), for example at 140° C. in the course of ten minutes. These reactions may obviously be carried out in the hot-air dryer at higher temperatures, for example up to 200° C., with correspondingly shorter residence periods, or at lower temperatures and with correspondingly longer residence periods. The reaction period and the reaction temperature required depend quite generally on the nature of the groups capable of addition or condensation, on the nature of the fabric to be finished and on the nature and amount of catalyst used.

Polyfunctional compounds, such as are necessary for indirect crosslinking, may be mixed with the dispersion in the padding machine or applied by means of a second bath. The latter method is to be recommended for example when the two components react slowly with each other even in the cold, when there is a risk of coagulation upon mixing, or when homogeneous distribution cannot be ensured.

For example, in a 30% dispersion the polymer content of which is 5 to 20% of polymerized-in butanediol monoacrylate and 5 to 20% of polymerized-in methylolmethacrylamide, there may be dissolved 5 to 10% of a water-soluble dye containing methylolamide groups and such an amount of phenylene-1,3-diisocyanate in the form of sodium bisulfite compound that the content of diisocyanate in the dispersion is 1 to 25%, preferably 5 to 15%. If desired 0.05 to 5% of a tertiary amine, for example pyridine, may be added as catalyst. A fabric padded with this dispersion is predried at 60° to 70° C. and then condensation effected at 110° to 160° C., advantageously at 115° to 125° C., the dye thus reacting substantially by way of the methylolamide radicals, whereas the crosslinking practically takes place only by addition of the diisocyanate to the hydroxyl groups of the butanediol monoacrylate. To remove the precipitated bisulfite, the finished fabric is washed and again dried, if desired on a tenter.

In the same way, fabric may be treated with an alcoholic solution of a polmer containing for example 5 to 10% of polymerized-in methacrylamide, which contains 5 to 10% of the tetrabutyl ether of tetramethylolacetylenediurea and 5 to 20% of a dye with a plurality of amide groups. Condensation may be carried out at a temperature of 130° to 160° C. within three to fifteen minutes. In this case the dye is not combined direct, but by way of a trimethylolmelamine molecule.

The components may also be applied by means of two liquors, for example in the first stage the polymer solution or dispersion may be applied and in the second stage the solution of the dye, if necessary mixed with the polyfunctional crosslinking agent.

The reaction period and reaction temperature in the hot air dryer are correlated to the crosslinking reaction; it is also possible to add catalysts to accelerate the reaction.

The polymer solutions or dispersions may be used according to this invention together with other textile finishes, such as urea-formaldehyde, melamine-formaldehyde, dicyanodiamide-formaldehyde or guanadine-formaldehyde condensates. Moreover, other polymers or emulsified highly polymerized natural substances, modified natural substances, polymers, copolymers, polycondensates or polyaddition products may be used in addition to the abovementioned polymers. For shading purposes, mixtures of coloured polymers may be applied. The new process of dyeing and resin finishing may also be combined with a previous, simultaneous or subsequent treatment of the material to be resin finished and dyed, for example, with water-soluble polymeric, natural, semisynthetic or synthetic substances, such as starches, starch degradation products, starch ethers, mucilages, cellulose ethers, alginates, vegetable gums, polymers or copolymers of unsaturated carboxylic acids or salts thereof, amides and other conventional compounds.

In the process according to this invention, the textile material treated is dyed and/or optically brightened and resin finished in a single operation and a considerable saving in time and labour is thereby achieved as compared with conventional textile finishing processes. The treated textiles are dyed very uniformly and extremely fast. The dye can only be separated from the fiber and from the applied polymer by degradation of the polymer. The dye and resin finishing agent are firmly combined with each other and therefore subsequent impairment of the shade by the finishing agent, such as often occurs in conventional finishing processes, is precluded, Moreover by appropriate choice of the initial materials used in the production of the copolymers, the polymers may be substantially adapted to requirements as regards shade, feel of the finished textiles or other effects, for example water repellency, so that the new process is capable of wide application. For example soft flexible finishes may be obtained by using plasticizing components, such as butyl acrylate, for the production of the polymers; if "rigid" components, such as styrene or vinyl chloride, are used for the production of the polymers, a specially full feel is achieved.

Textiles of natural, semisynthetic or synthetic fibers, for example cotton, spun rayon, cellulose acetate, cellulose triacetate, synthetic polyamides, polyacrylonitrile or copolymers containing acrylonitrile, and above all textiles of synthetic fibers which it is difficult to dye and finish by conventional methods, such as polypropylene textiles, may be treated by the process according to this invention.

The process according to this invention is also suitable for resin finishing textiles by application of a coherent film. If desired a plurality of coats may be applied to the fabric. It is preferred that only, or at least, the top coat be applied by the process according to this invention.

Application of the polymers and reactive dyes according to this invention may also be carried out by the conventional methods of textile printing.

A special embodiment of the new process comprises preparing bonded fabrics by using polymers according to this invention simultaneously as bonding agents and dyes.

The invention is illustrated by, but not limited to, the following examples in which parts and percentages are by weight.

Example 1

A washed cotton fabric is impregnated with a mixture of 50 parts of a 10% aqueous solution of a dye (diazotized N-(p-amino-phenyl)-glyoxaldiureine, coupled with 8-acetylaminonaphthol-(1)-3,6-disulfonic acid), 0.15 part of ammonium nitrate and 250 parts of a 40% aqueous polymer dispersion which has been prepared by emulsion polymerization of 270 parts of butyl acrylate, 30 parts of N-methylolmethacrylamide in 450 parts of water with 0.5 part of potassium persulfate as catalyst and 5.5 pairs of a sulfation product of an oxyethylated fatty alcohol as emulsifier. The fabric is squeezed out and heated to 140° C. on a tenter.

The treated fabric is boiled in a solution containing per liter 2 g. of curd soap and 1 g. of soda, washed with distilled water, dried and weighed. A decrease in weight of 0.5 to 0.7% with reference to the entire fabric is determined. No further decrease in weight occurs upon repeated washing, and the violet-red color of the fabric remains unchanged.

Example 2

A mixture is prepared from 40 parts of 12.5% aqueous solution of a dye (which has been obtained by coupling diazotized N-p-aminophenylurea with 8-acetylaminonaphthol-(1)-3,6-disulfonic acid), 250 parts of the polymer dispersion according to Example 1 and 0.3 part of ammonium nitrate. Cotton fabric is impregnated therewith and dried for an hour at 130° C. The increase in weight is 15%. The violet shade and the feel of the dyed and resin finished fabric do not change appreciably after repeated washing and subsequent drying.

Example 3

A fabric of regenerated cellulose is impregnated with a liquor obtained by mixing 50 parts of a 10% aqueous solution of a coupling product of diozotized N-(p-aminophenyl)-glyoxaldiureine with 1-(p-sulfophenyl)-3-methylpyrazolone-(5) which has been reacted with formaldehyde, 0.5 part of ammonium nitrate and 250 parts of a polymer dispersion. This polymer dispersion is prepared by emulsion polymerization of 266 parts of butyl acrylate and 14.2 parts of N-methylolmethacrylamide in 376 parts of water in the presence of potassium persulfate as catalyst and a sulfated oxyethylated fatty alcohol as emulsifier. The fabric is stretched on a frame; by heating to 140° C., the dye is condensed with the copolymer, and the free methylol groups of the copolymer crosslink with each other. A yellow dyeing with a very washfast finish is thus obtained.

Example 4

A fabric of acetylated cellulose is impregnated with a mixture of 35.5 parts of a 14% aqueous solution of the dye specified in Example 3, 20 parts of dimethylolurea, 0.5 part of ammonium nitrate and 250 parts of an aqueous polymer dispersion which has been prepared by emulsion polymerization of 340 parts of butyl acrylate and 60 parts of methacrylamide in 568 parts of water in the presence of 1 part of potassium persulfate and 60 parts of a 20% aqueous solution of the sulfation product of an ethylated fatty alcohol.

Condensation of the polymer with the dye and the further crosslinking are achieved by heating for one hour at 140° C. The yellow colored finish has good resistance to washing.

Example 5

A copolymer having a K-value of 37, prepared by polymerization of 20 parts of acrolein, 50 parts of butyl acrylate and 30 parts of styrene in the presence of 0.5 part of benzoyl peroxide as catalyst is dissolved in a mixture of 72 parts of butanol and 28 parts of toluene and diluted to 20% with the same solvent mixture; the whole is then reacted with 2.5 parts of 4-azophenylacetic acid anilide containing a reactive methylene group.

2 parts of piperidine is added to 1000 parts of this solution and a calico cloth is impregnated with the solution and heated for thirty minutes at 120° C. Resin finishing and simultaneous yellow dyeing of the material is thus achieved. The finish has good resistance to alkaline washing and dry cleaning.

*Example 6*

150 parts of a 20% aqueous solution of a precipitation polymer which has been prepared from 110 parts of acrylamide, 20 parts of tert.-butyl acrylate, 70 parts of ethyl acrylate and 0.4 part of azodiisobutyronitrile in 800 parts of butanol, is combined with a solution of 28 parts of dimethylolurea, 0.6 part of ammonium nitrate and 1.5 parts of the methylolated dye of Example 3 in 150 parts of water. Non-woven cotton fabric is impregnated with the liquor and heated for an hour at 150° C. A strongly yellow colored bonded fabric is obtained having good fastness to washing.

*Example 7*

100 parts of a copolymer derived from 15 parts of acrylamide, 60 parts of butyl acrylate, 10 parts of vinyl propionate, 5 parts of acrylonitrile and 10 parts of vinyl acetate, prepared by copolymerization in 100 parts of toluene-butanol (1:1) is heated together with 7.5 parts of the N-methylol compound of the dye derived from diazotized 4-aminophenylurea and 4-tert.-butylphenol in a 20% solution, with reference to the copolymer, in the presence of 0.5 part of phosphoric acid for twenty minutes at 60° C. The mixture is then deluted to 10%, and 10 parts of the tetrabutyl ether of tetramethylolglyoxaldiureine and 2 parts of a condensation product of phenol and formaldehyde are incorporated. After 0.5 part of phosphoric acid has been added, the solution is used to impregnate calico cloth which is then squeezed out and dried on a tenter for thirty minutes at 150° C. A very wash-fast finish and simultaneous yellow dyeing of the cloth is achieved.

*Example 8*

A precipitation polymer is prepared by polymerization of 110 parts of acrylamide, 20 parts of N-methylolmethacrylamide and 70 parts of ethyl acrylate in 600 parts of butanol using 1 part of benzoyl peroxide and 0.4 part of sodium hydroxymethanesulfinate. 5 parts of this polymer and 0.83 part of the methylolated dye of Example 4 are dissolved in 94 parts of water. 20 parts of a 50% aqueous solution of butanediol-1,4-bis-(N-methylolurethane) is added as a crosslinking agent and 0.2 part of ammonium nitrate as a catalyst. A cotton fabric impregnated with this solution is heated for one hour at 150° C. and is thereby dyed and finished wash-fast.

The increase in weight of four test pieces of fabric thus treated was 13.51%, 13.43%, 13.10% and 13.69%.

The decrease in weight of the samples after a first washing carried out under the conditions described in Example 1 is about 0.4%. The color intensity is unchanged. Neither the weight nor the color strength is affected by further washing.

*Example 9*

A polypropylene fabric is impregnated with a mixture of 0.7 part of a dye (a coupling product of N-(p-aminophenyl)-glyoxaldiureine and 1-naphthol-4-sulfonic acid which has been reacted with 2 to 3 moles of formaldehyde), 1.5 parts of a 85% aqueous solution of the dimethylol compound of butanediol-1,4-diurethane, 0.3 part of ammonium nitrate, 0.2 part of the sodium salt of sulfonated oleic acid hexamethylenimide, 73 parts of water and 25 parts of a 40% aqueous polymer dispersion.

The polymer dispersion is obtained by emulsion polymerization of 266 parts of butyl acrylate and 14.2 parts of N-methylolmethacrylamide in 376 parts of water in the presence of 1.5 parts of potassium persulfate as catalyst and 5 parts of a sulfated oxyethylated fatty alcohol as emulsifier.

The fabric is stretched on a tenter and heated for an hour at 140° C.

The treated fabric is boiled in a solution containing in each liter of water 2 g. of curd soap and 1 g. of sodium carbonate, washed with distilled water, dried and weighed. There is a decrease in weight of 1.67% with reference to the weight of polymer taken up. There is no further decrease in weight upon repeated washing. The red color of the samples remains unchanged.

*Example 10*

A polypropylene fabric is impregnated with a mixture of 0.7 part of a dye (coupling product of N-(m-aminophenyl)-glyoxaldiureine and 1-phenyl-(3-sulfonic acid)-3-methylpyrazolone-(5) reacted with 2 to 3 moles of formaldehyde), 1.5 parts of the dimethylol compound of butanediol-1,4-diurethane, 0.5 part of ammonium nitrate, 0.3 part of the sodium salt of a sulfonated oleic acid hexamethylenimide, 73 parts of water and 25 parts of the 40% aqueous polymer dispersion of Example 9. The fabric is heated for an hour at 140° C. on a tenter. A wash-fast yellow dyeing resistant to abrasion is obtained.

*Example 11*

A polypropylene fabric is impregnated with a mixture of 0.7 part of the dye described in Example 1 which has been reacted with 2 to 3 moles of formaldehyde, 1.5 parts of the dimethylol compound of butanediol-1,4-diurethane, 0.6 part of ammonium nitrate, 0.3 part of the sodium salt of a sulfonated oleic acid hexamethylenimide, 73 parts of water and 25 parts of the 40% aqueous polymer dispersion of Example 9. The fabric is heated for an hour at 140° C. on a tenter. A wash-fast, abrasion-resistant red dyeing is obtained.

*Example 12*

A polypropylene fabric is impregnated with a mixture of 0.7 part of dye (a coupling product of N-(p-aminophenyl)-glyoxaldiureine and 8-acetylaminonaphthol-(1)-3,5-disulfonic acid which has been reacted with 2 to 3 moles of formaldehyde), 1.5 parts of an 85% aqueous solution of the dimethylol compound of butanediol-1,4-diurethane, 0.6 part of ammonium nitrate, 0.3 part of the sodium salt of a sulfonated oleic acid hexamethylenimide, 73 parts of water and 25 parts of the 40% aqueous polymer dispersion of Example 9. The fabric is heated for an hour at 140° C. on a tenter. An abrasion-resistant and wash-fast violet-red dyeing is obtained.

*Example 13*

A polypropylene fabric is impregnated with a mixture of 0.7 part of a dye (a coupling product of N-(3-chloro-4-aminophenyl)-glyoxaldiureine and 8-acetylaminonaphthol-(1)-3,6-disulfonic acid, which has been reacted with 2 to 3 moles of formaldehyde), 1.5 parts of an 85% aqueous solution of the dimethylol compound of butanediol-1,4-diurethane, 0.6 part of ammonium nitrate, 0.3 part of the sodium salt of a sulfonated oleic acid hexamethylenimide, 73 parts of water and 25 parts of the 40% aqueous polymer dispersion of Example 9.

The fabric is heated on a tenter for an hour at 140° C. A wash-fast, abrasion-resistant violet dyeing is obtained.

*Example 14*

170 parts of an about 40% aqueous dispersion of a copolymer derived from 55% of isobutyl acrylate, 20% of acrylonitrile, 20% of vinyl chloride and 5% of N-methylolmethacrylamide is mixed with 40 parts of a 6% tragacanth thickening, 20 parts of a 50% aqueous solution of the adduct of about 25 moles of ethylene oxide to 1 mole of sperm oil alcohol, 20 parts of a 50% aqueous solution of ammonium nitrate and 20 parts of an about 70% aqueous solution of a urea-formaldehyde precondensate partly etherified with methanol.

100 parts of a 20% aqueous solution of a coupling product of diazotized N-(p-aminophenyl)-glyoxaldiureine and 1-naphthol-4-sulfonic acid which has been reacted with formaldehyde is added to the said mixture and 630 parts of heavy gasoline (a hydrocarbon mixture with a boiling range of 140° to 220° C., flash point according to Abel-Pensky 30° C. and content of aromatics less than 15%) is stirred in with an impeller (speed, 3000 to 6000 r.p.m.).

A printing paste is obtained with which cotton fabric, spun rayon fabric and viscose rayon fabric are printed on a roller printing machine. The printed fabrics are dried at about 50° C. and fixed for seven minutes at 140° C.; then they are rinsed with cold and hot water. Bright red prints are obtained with good depth of color and with very good fastness to abrasion, washing and solvents.

Fabric of polyamides, polyesters, polyacrylonitrile, polypropylene, cellulose acetate, natural silk and wool may also be printed with the said printing paste. After the printed fabric has been dried, it is treated for five minutes with saturated steam at about 100° to 102° C. and then treated dry for five minutes at 120° C. After the fabric has been rinsed in water, prints having good fastness are obtained.

*Example 15*

130 parts of an about 40% aqueous dispersion of a copolymer derived from 80% of butyl acrylate, 16% of acrylonitrile and 4% of N-methylolacrylamide is mixed with 50 parts of a 20% aqueous solution of the azo dye specified in Example 14 and 20 parts of a 50% aqueous solution of ammonium thiocyanate. Then 800 parts of thickener emulsion is added which has been obtained by stirring 78% of heavy gasoline (having the properties given in Example 14) into a solution of 1% of a 50% aqueous solution of the sodium salt of the acid sulfuric acid ester of the adduct of about 80 moles of ethylene oxide to 1 mole of sperm oil alcohol and 3% of a 6% tragacanth thickening in 18% of water.

A cotton fabric and a polyamide fabric are printed with the said printing paste by screen printing, dried and aftertreated dry for eight minutes at 130° C. After the fabrics have been rinsed, bright prints having good depth of color and good fastness properties are obtained.

*Example 16*

570 parts of the thickener emulsion described in Example 15 and a mixture of 40 parts of aluminum sulfate, 30 parts of tartaric acid and 80 parts of 6% tragacanth thickening are added to 200 parts of an about 40% aqueous dispersion of a colopymer derived from 45% of butyl acrylate, 50% of styrene and 5% of methylolmethacrylamide. 80 parts of a 25% aqueous solution of a coupling product of diazotized N-(p-aminophenyl)-glyoxaldiureine and 1-phenyl-(2'-chloro-5'-sulfonic acid)-pyrazolone-(5) is added to the said mixture.

A cotton fabric which has been impregnated with an aqueous solution of 2-hydroxynaphthalene-3-carboxylic acid anilide is printed with the said printing paste on a roller printing machine, dried at about 100° C. and treated conventionally with Variamine blue salt B solution. A bright yellow resist print under the Variamine blue is obtained with good fastness.

*Example 17*

350 parts of an about 40% aqueous dispersion of a copolymer derived from 47% of butyl acrylate, 40% of vinyl chloride, 10% of methyl acrylate and 3% of acrylamide are mixed with 20 parts of a 20% aqueous solution of the adduct of about 25 moles of ethylene oxide to 1 mole of sperm oil alcohol and 30 parts of a 6% tragacanth thickening and then emulsified in 600 parts of heavy gasoline (with the properties specified in Example 14) with an impeller.

700 parts of this printing binder is mixed with 150 parts of an about 50% aqueous paste of zinc oxide containing emulsifier, 5 parts of triethanolamine, 30 parts of a 50% aqueous solution of ammonium nitrate and 15 parts of an about 70% aqueous solution of a urea-formaldehyde precondensate partly etherified with methanol; then 100 parts of a 20% aqueous solution of a coupling product from diazotized p-aminophenylurea and 1-phenyl-(3'-sulfonic acid)-3-methylpyrazolone-(5) which has been reacted with formaldehyde is added.

A cotton fabric is printed with this printing paste on a roller printing machine and then fixed for fiive minutes at 150° C. The fabric is then padded with an aqueous solution of aniline and aniline hydrochloride, dried and steamed for three minutes and given a conventional oxidative aftertreatment. A yellow resist print is obtained under aniline black with good fastness.

*Example 18*

200 parts of the copolymer dispersion described in Example 15 is mixed with 70 parts of a 15% aqueous solution of the azo dye specified in Example 16, 600 parts of the thickener emulsion of Example 15, 30 parts of a 50% aqueous solution of ammonium nitrate and a mixture of 50 parts of the sodium salt of hydroxymethanesulfinic acid and 50 parts of 6% tragacanth thickening.

Cotton fabric which has been dyed black substantively with Direct black 32 (C.I. 35,440) is printed with this printing paste by screen printing, dried and steamed for seven minutes. A discharge print with good fastness properties is obtained.

*Example 19*

A washed cotton fabric is soaked with a mixture of 25 parts of a 40% aqueous polymer dispersion, obtained by emulsion-polymerization of a solution of 285 parts of butyl acrylate and 15 parts of N-methylolmethacrylic acid amide in 450 parts of water with 0.5 part of potassium persulfate and 5.5 parts of an emulsifier (sodium salt of the sulfonated reaction product of 1 mole of sperm oil alcohol and 25 moles of ethylene oxide); 1 part of aminoterephthalic acid diamide dissolved in 100 parts of a 1:1 dimethyl formamide-water mixture; 2 parts of an 85% aqueous solution of the dimethylol compound of butanediol-(1,4)-diurethane; 0.4 part of ammonium nitrate and 0.2 part of a 55% aqueous solution of the sodium salt of sulfonated oleic acid hexamethylene imide, squeezed and heated at 140° C. for 30 minutes on a tenter frame. The finished fabric shows strong fluorescence. The fluorescent component cannot be removed by an alkaline washing at the boil.

We claim:
1. A process for the simultaneous dyeing and resin finishing of a fibrous textile material which comprises: coating the textile fibers with

(A) an addition interpolymer obtained by addition polymerization through ethylenically-unsaturated linkages and consisting of
  (1) polymerized monomeric units substituted by reactive groups capable of cross-linking in the presence of an acid catalyst, said reactive groups being selected from the class consisting of amide and N-methylolamide and its ethers, and
  (2) at least one other polymerized monomeric unit selected from the class consisting of styrene, butadiene, isoprene, acrylonitrile, methacrylonitrile, vinyl acetate, vinyl propionate, vinyl butyrate, vinyl chloride, allyl esters, vinyl imidazole and N-vinylpyrrolidone, the molor proportion of the reactive groups in the polymer, with reference to the total mols of polymerized monomeric units, being between about 5% and 10%, 2 to 5% thereof serving for the linking of an equivalent molar amount of said dye to said polymer, and at least 0.5% of the balance thereof serving for cross-linking the polymer on the fibers, and (B) a dye substituted by reactive groups capable of linking with the reactive groups of said addition interpolymer, said reactive groups on said dye being selected from the class consisting of amide, N-methylolamide and its ethers, imide, ureido, thioureido, dicyandiamide, carboxylic acid, carboxylic acid ester, sulfonic acid, sulfonic acid ester, aldehyde, epoxy, chlorohydrin, isocyanate, amino, hydroxyl mucochloric acid and urethane and heating the fibers thus coated with said interpolymer and said dye for simultaneous linking of said dye to said polymer and cross-linking of said polymer on said fibers.

2. A process as claimed in claim 1 wherein Component (A) (1) is acrylamide.

3. A process as claimed in claim 1 wherein Component (A) (1) is N-methylol-acrylamide.

4. A process as claimed in claim 1 wherein Component (A) (1) is methacrylamide.

5. A process as claimed in claim 1 wherein Component (A) (1) is N-methylol-methacrylamide.

6. A process as claimed in claim 1 wherein the dye is an azo dye.

7. A process as claimed in claim 1 wherein the dye is a fluorescent compound.

8. A process as claimed in claim 1 wherein the coated fibers are heated in the presence of an acid catalyst.

9. A process as claimed in claim 8 wherein the coated fibers are heated in the presence of a bifunctional cross-linking agent selected from the class consisting of formaldehyde, urea-formaldehyde polycondensates containing N-methylol groups, melamine-formaldehyde polycondensates containing N-methylol groups and carbamic esters of polyfunctional alcohols containing N-methylol groups.

References Cited by the Examiner

UNITED STATES PATENTS

| 2,093,651 | 9/1937 | Widmer et al. | 8—74 X |
| 2,416,884 | 3/1947 | Schreiber et al. | 8—74 |
| 2,473,403 | 6/1949 | Woodward. | |
| 2,762,719 | 9/1956 | Kleiner et al. | 8—18 X |

FOREIGN PATENTS 846,505   8/1960   Great Britain.

NORMAN G. TORCHIN, *Primary Examiner.*